Figure 3:
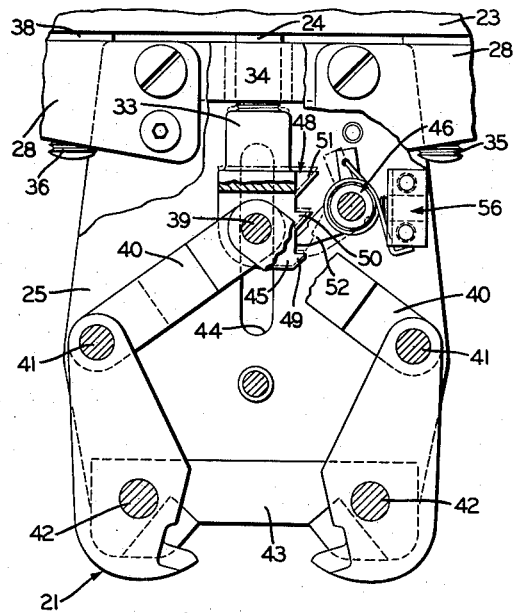

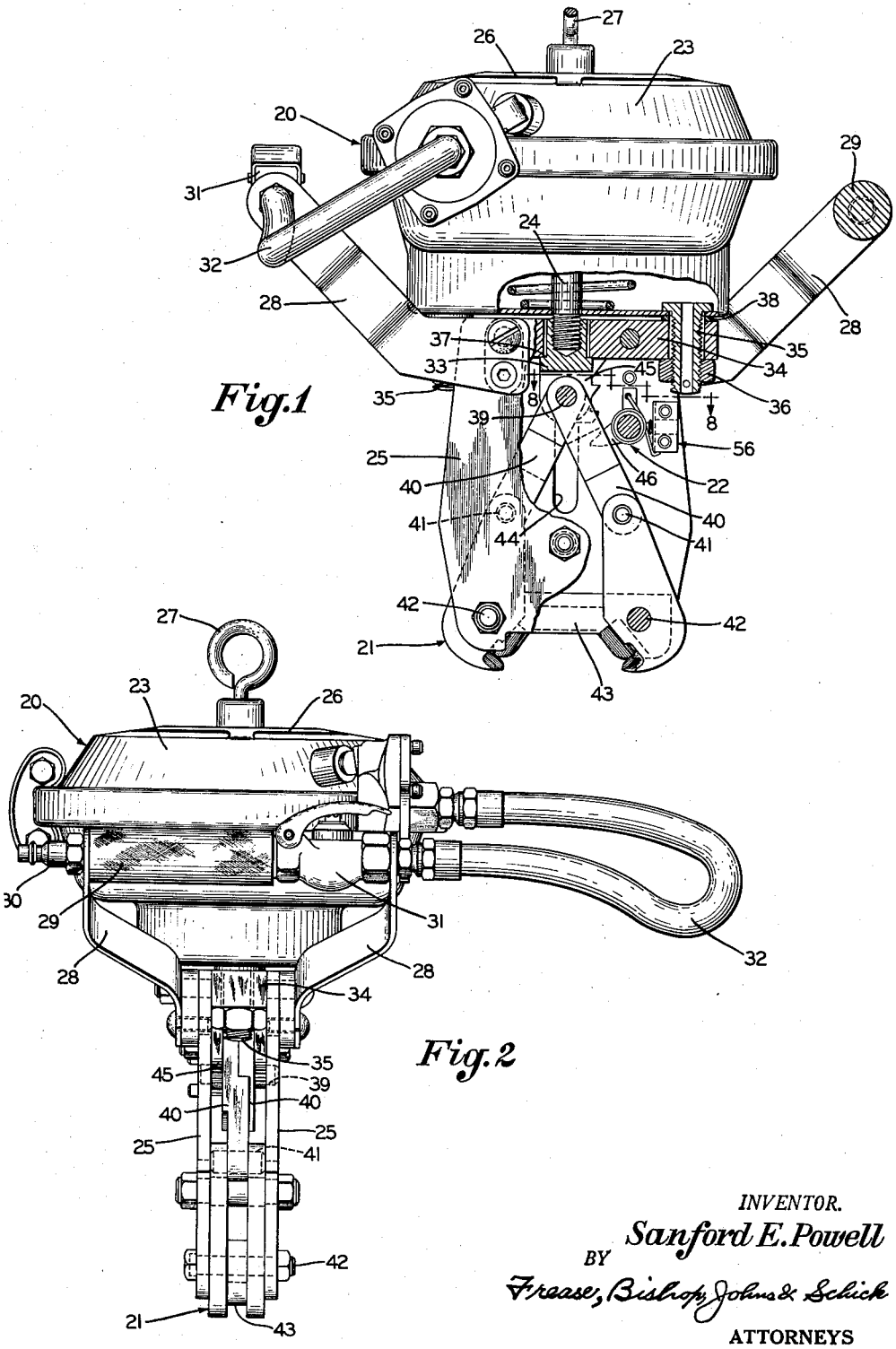

March 14, 1961 S. E. POWELL 2,974,551
STRAP SEALING DEVICE WITH FULL STROKE COMPELLING MEANS
Filed Feb. 26, 1959 3 Sheets-Sheet 2

INVENTOR.
Sanford E. Powell
BY
Frease, Bishop, Johns & Schick
ATTORNEYS

March 14, 1961 — S. E. POWELL — 2,974,551
STRAP SEALING DEVICE WITH FULL STROKE COMPELLING MEANS
Filed Feb. 26, 1959 — 3 Sheets-Sheet 3

INVENTOR.
Sanford E. Powell
BY
Frease, Bishop, Johns & Schick
ATTORNEYS

United States Patent Office 2,974,551
Patented Mar. 14, 1961

2,974,551

STRAP SEALING DEVICE WITH FULL STROKE COMPELLING MEANS

Sanford E. Powell, Warren, Ohio, assignor to Sharon Steel Corporation, Sharon, Pa., a corporation of Pennsylvania Filed Feb. 26, 1959, Ser. No. 795,812

12 Claims. (Cl. 81—9.1)

My invention relates generally to improvements in sealing tool construction, and more specifically to a sealing tool construction which insures that once the sealing operation has been started, it must be fully and properly completed. Still more specifically, my invention relates to a sealing tool construction having the foregoing safety properties and which may be power driven.

Certain prior constructions of sealing tools for use in sealing or crimping generally U-shaped metal seals around overlapped end portions of strapping binding a particular object have merely included a pair of pivotally mounted sealing jaws moved into and out of sealing position by means of a hand-operated actuating or operating handle. With this form of construction, whether or not the seal is properly crimped or clamped around the overlapped ends of the length of strapping is purely dependent on whether or not the person operating the tool has sufficient strength to accomplish the sealing operation and whether or not this person is sufficiently conscientious to be sure that the seal is properly formed by the tool.

Thus, with this prior form of sealing tool construction, difficulties have been encountered from the person operating the sealing tool failing to apply sufficient force to the operating handle to properly complete the forming or crimping of the seal. If the seal is not properly formed and does not securely clamp the overlapped ends of strapping, then the particular object or package being bound by the strapping becomes unbound during handling and shipment, so that the materials contained in such package become damaged and displaced.

Various attempts have been made to overcome these difficulties by providing a sealing tool construction in which the sealing jaws, operating handle or mechanical linkages therebetween are operably connected with a rack and pawl mechanism. In this construction, the rack and pawl mechanism is engaged in one manner to permit the sealing jaw closing stroke of the operating handle, but preventing reversal thereof until the stroke is completed, after which this mechanism automatically reverses and permits the opening stroke of the handle, while preventing the reversal thereof until the opening stroke is completed. This form of prior sealing tool construction does insure that the seal is properly crimped or formed around the overlapped ends of strapping for securely binding the particular object or package being bound, but in doing so in this particular manner it presents certain other difficulties.

These difficulties occur when the particular seal being formed by the sealing tool becomes slightly wedged or jammed in the sealing jaws because of not being perfectly aligned with the sealing jaws or because it is slightly oversize. If this occurs, it is necessary on the opening stroke of the sealing jaws and operating handle to move the jaws slightly inwardly and outwardly toward and away from their sealing position to disengage the seal therefrom, and with the rack and pawl mechanism being engaged during this opening stroke and preventing reversal of the sealing jaws and operating handle during the opening stroke, this disengagement procedure cannot take place, and it is necessary to spend considerable valuable production time in removing the seal from the sealing jaws by use of other tools.

It is, therefore, highly desirable to provide a sealing tool construction which has safety means thereon for insuring that once the sealing stroke is started, it must be completed to the point that the seal is properly formed or crimped, and yet this safety means permits the sealing jaws and operating means to be completely free for movement during at least the major portion of the opening stroke. Further, in view of the use of larger and larger sizes of metal strapping requiring larger and larger seals to bind the overlapped ends thereof, it is desirable to provide such a sealing tool construction which may be powered by electric, pneumatic or hydraulic means.

It is, therefore, a general object of the present invention to provide a sealing tool construction which eliminates the above-mentioned difficulties and disadvantages of the prior constructions and has the foregoing desirable features.

It is a primary object of the present invention to provide a sealing tool construction which has means thereon automatically operable for insuring that once the sealing stroke has been started, it must be completed to properly secure the seal around the overlapped ends of the lengths of strapping being sealed, yet provides freedom of movement for the sealing jaws and operating means during the opening stroke.

It is a further object of the present invention to provide a sealing tool construction which includes rack and pawl means operably connected with the operating means and sealing jaws, which rack and pawl means is automatically engaged during the closing stroke of the sealing jaws to insure that the sealing jaws complete the entire sealing stroke, and thereafter this rack and pawl means is automatically completely disengaged to provide freedom of movement of the sealing jaws during the opening stroke thereof.

It is still a further object of the present invention to provide a sealing tool construction having the foregoing advantageous features, yet may be adapted for being power driven by any usual means.

Finally, it is an object of the present invention to provide a sealing tool construction satisfying all of the foregoing objects, yet which is relatively simple in construction, positive and durable in operation, and may be provided at a minimum cost.

These and other objects are accomplished by the parts, constructions, arrangements, combinations and subcombinations comprising the present invention, the nature of which is set forth in the following general statement, a preferred embodiment of which—illustrative of the best mode of which applicant has contemplated applying the principles—is set forth in the following description and illustrated in the accompanying drawings, and which is particularly and distinctly pointed out and set forth in the appended claims forming a part hereof.

In general terms, the sealing tool construction comprising the present invention may be stated as including operating means mounted on a main frame member, sealing jaws pivotally mounted on the main frame member and operably connected to the operating means for pivotal movement through a closing stroke and opening stroke upon operation of the operating means, rack and pawl means operably connected with the sealing jaws and automatically engaged during the closing stroke and automatically completely disengaged during the opening stroke, and means operatively engageable with the pawl means for placing the pawl means in a position engageable with the rack during the closing stroke and in a position completely disengaged from the rack during the opening stroke.

The operating means may be fluid-powered means preferably having a reciprocal stroke and preferably having selectively adjustable means operably connected thereto for regulating the minimum extent of such reciprocal stroke. Further, the rack means is preferably mounted on the operable connection between the operating means and sealing jaws and is provided with spaced teeth engageable by the pawl means for preventing reversal of the closing stroke of the sealing jaws once this closing stroke has been started and until it is properly completed. Still further, it is preferred to provide one of the rack means teeth formed in such a way and having a particular relation to the pawl means so that this particular rack means tooth cooperating with the pawl means serves as the automatic means for placing the pawl means in its engaged position during the closing stroke and completely disengaged position during the opening stroke.

Also, preferably the combination of the particular positioning of the pawl means with respect to the path of travel of the rack means and resilient means operably engaged with the pawl means insures the proper engagement of the pawl means with the rack means during the closing stroke of the sealing jaws so that the rack and pawl means positively prevent reversal of the sealing jaw closing stroke until such stroke is completed. Finally, the pawl means is preferably provided with resilient holding means automatically engageable with the pawl means when the pawl means is moved to its completely disengaged position for positively retaining the pawl means in its completely disengaged position until the pawl means is automatically moved from such position.

Figure 4:
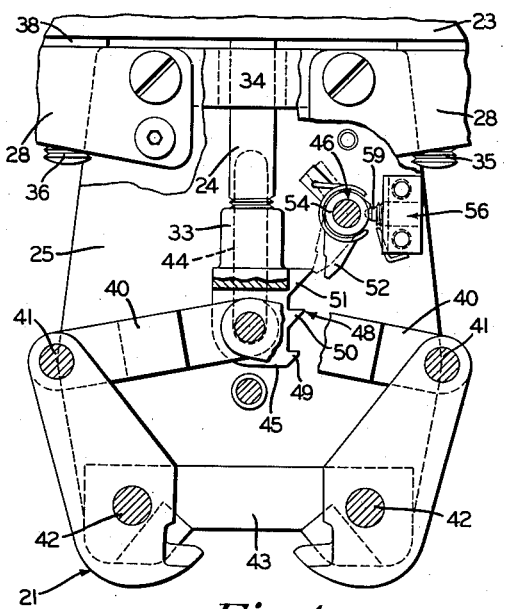
Figure 6:
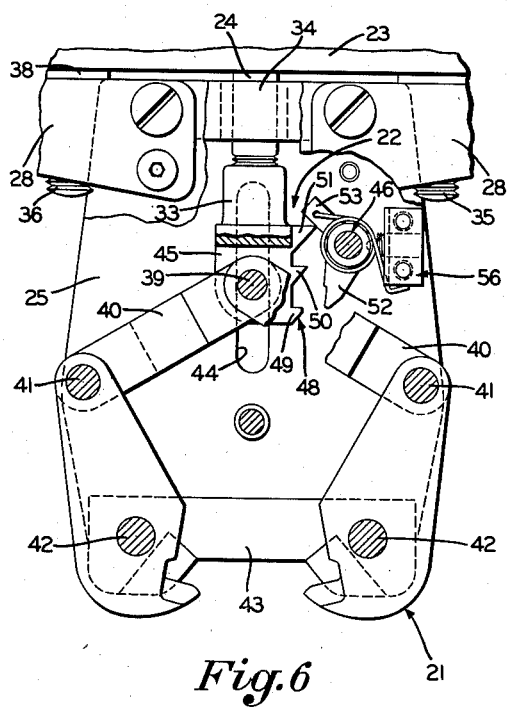
Figure 5:
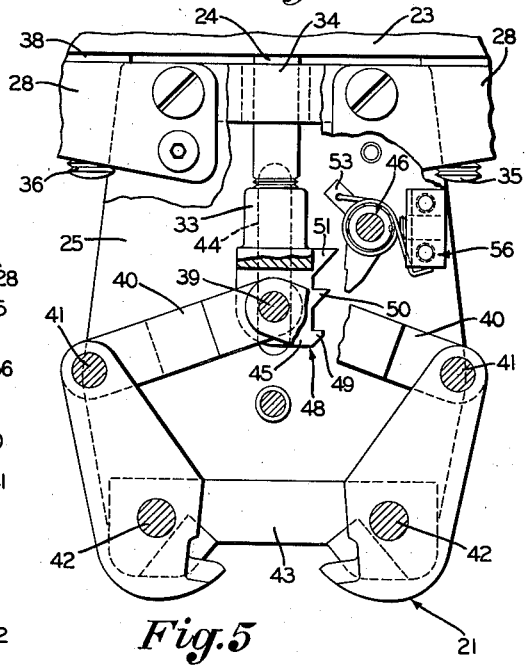
Figure 9:
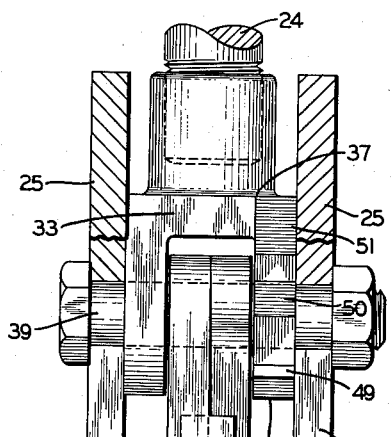
Figure 8:
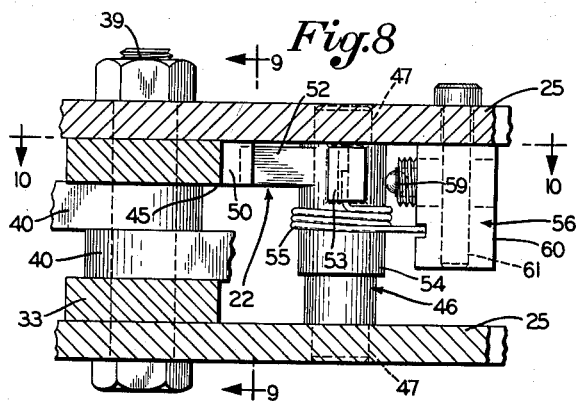
Figure 11:
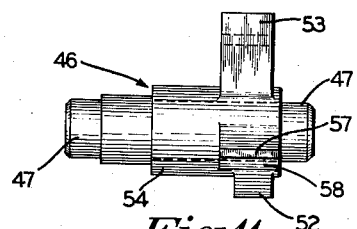
Figure 10:
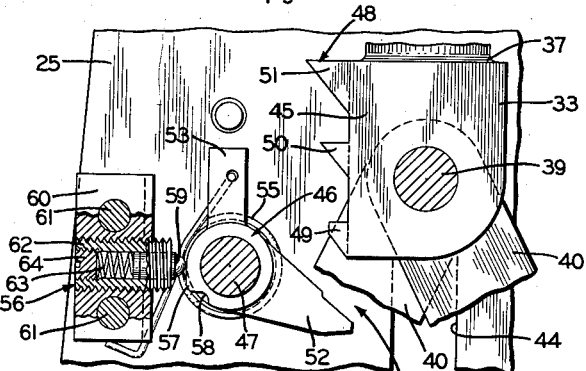
Figure 7:
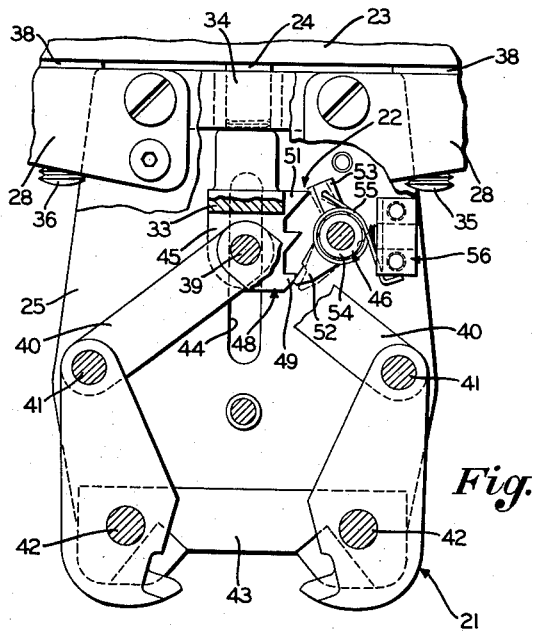
Figure 12:
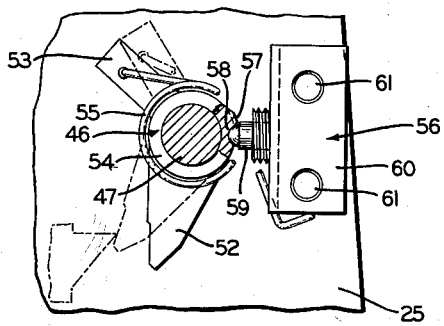

By way of example, an embodiment of the sealing tool construction of the present invention is illustrated in the accompanying drawings forming a part hereof, wherein like numerals indicate similar parts throughout the several views, and in which:

Fig. 1 is a side elevation of the sealing tool construction of the present invention with parts thereof broken away and in section to show certain details of the construction, and with the sealing jaws in their completely open position and the other parts in their corresponding positions;

Fig. 2, an end elevation of the sealing tool construction of Fig. 1;

Fig. 3, an enlarged fragmentary side elevation partially broken away and in section, showing the sealing jaws intermediate their closing stroke, with other parts of the construction in their corresponding positions;

Fig. 4, a view similar to Fig. 3, showing the sealing jaws near the completion of the sealing stroke;

Fig. 5, a view similar to Fig. 3, showing the sealing jaws intermediate their open stroke;

Fig. 6, a view similar to Fig. 3, showing the sealing jaws near the end of their opening stroke and the rack and pawl means just prior to being automatically repositioned for being in proper position for commencement of the next sealing or closing stroke;

Fig. 7, a view similar to Fig. 3, showing the sealing jaws near the end of their opening stroke with the pawl means having been automatically released and returning toward its position for engaging the rack means during the next sealing or closing stroke;

Fig. 8, an enlarged fragmentary sectional view, part in elevation, looking in the direction of the arrows 8—8 in Fig. 1;

Fig. 9, a fragmentary sectional view, part in elevation looking in the direction of the arrows 9—9 in Fig. 8;

Fig. 10, a fragmentary sectional view, part in elevation, looking in the direction of the arrows 10—10 in Fig. 8;

Fig. 11, an enlarged end elevation of the pawl means removed from the remainder of the construction; and Fig. 12, an enlarged fragmentary side elevation, part in section, and with parts broken away, taken from Fig. 4 and showing certain of the construction details of the pawl means and its associated parts.

The sealing tool construction comprising the present invention, as shown in Figs. 1 and 2, includes operating means generally indicated at 20 operably connected for opening and closing sealing jaws generally indicated at 21, with rack and pawl means generally indicated at 22 also being operably connected to the sealing jaws for engagement during the closing stroke of the sealing jaws and complete disengagement during the opening stroke of the sealing jaws. Although it is not intended to limit the broad principles of the present invention to hand or power operation, as shown in the drawings, it is preferred that the operating means 20 is a pneumatic or hydraulic diaphragm type motor 23 of usual construction and providing axially reciprocal motion to the operating shaft 24.

As shown, the fluid motor 23 is mounted at the top portion of the main frame member 25, with the motor casing 26 having a usual eye 27 at the top portion thereof for suspending the entire construction as desired. Further, also supported on the main frame member 25 adjacent the lower portion of the fluid motor 23 and extending laterally outwardly and upwardly are the handle brackets 28 which mount the usual gripping handles 29.

As viewed in Fig. 1, the left-hand gripping handle 29 surrounds a fluid supply line which commences at the nipple 30, extends through the handle, supply valve 31, connector hose 32 and ultimately extends through the motor casing 26 and is connected to the fluid motor 23. Thus, the fluid motor 23 may be conveniently controlled by the operator at the supply valve 31, while the operator grips the entire mechanism by means of the tripping handles 29.

The lower end of the fluid motor operating shaft 24 is threadably engaged with a yoke 33, with both the upper portion of the yoke 33 and the lower portion of the operating shaft 24 being telescoped by an adjusting plate 34. Plate 34 is adjustably connected to the lower portion of the motor casing 26 by means of a pair of spaced threaded studs 35 and nuts 36, with the adjusting plate limiting the upward or opening movement of the fluid motor operating shaft 24 and yoke 33 by means of the shoulders 37 of yoke 33 engaging the lower surface of plate 34, while this plate permits unrestricted downward or closing movement of the shaft and yoke.

By placement of shim members such as the washers 38, as shown in Fig. 1, around the studs 35 above the adjusting plate 34 and between this plate and the lower surface of the motor casing 26, the adjusting plate may be maintained in any vertical position desired to thereby limit the upward or opening stroke of shaft 24 and yoke 33 as desired. This provides proper adjustment for limiting the opening movement of the sealing jaws 21 in view of the yoke being operably connected to the sealing jaws and providing their pivotal movement, as will be hereinafter described.

Pivotally connected to the lower end of the yoke 33 by means of a pivot pin 39 are a pair of usual operating links 40, which operating links are in turn each pivotally connected to opposing sets of usual sealing jaws 21 by means of the pivot pins 41. Sealing jaws 21 are in turn pivotally mounted on the main frame member 25 in usual manner by means of the pivot pins 42, so that a downward movement of the yoke 33 transmits an outward force to the upper ends of the sealing jaws 21 through the operating links 40, causing the sealing jaws to pivot on the main frame member 25 and move toward their closed or sealing position, whereas an upward movement of the yoke causes the jaws to open through this same means.

The main frame member 25 may be provided with the usual bridge member 43 mounted for cooperating with the sealing jaws 21 to properly seal or clamp a generally U-shaped metal seal, not shown, when the sealing jaws are closed. Further, it is preferred to extend the pivot pin 39 which pivotally connects the upper ends of the operating links 40 to the yoke 33 outwardly a sufficient distance to be slidably received through the guide slots 44 formed in the main frame member 25, so that pin 39 guides the operating shaft 24 and yoke 33 in their reciprocal upward and downward movement, to thereby insure that each of the sets of sealing jaws 21 will receive an equal amount of motion from the operating links 40 and will close evenly, each pivoting the same amount.

Also, these guide slots 44 in providing the guided reciprocal movement of the operating shaft 24 and yoke 33 insure proper operation of the rack and pawl means generally indicated at 22. As shown in Figs. 1 and 3 through 12, the rack and pawl means 22 preferably includes a rack 45 formed at one side of the yoke 33, and a pawl 46 pivotally mounted on the main frame member 25 by means of the preferably integral mounting pin 47 and in proper alignment with the path of travel of the yoke 33 and rack 45.

Rack 45 preferably is formed integrally with the yoke 33 and is provided with preferably three vertically spaced engagement teeth 48, with the lowermost tooth 49 being relatively small, the middle tooth 50 being only slightly larger than tooth 49, and with the uppermost tooth 51 being considerably larger in size and preferably in cooperation with the pawl 46 serving as the engagement and disengagement means or reversing means, as will be hereinafter described in detail. Further, the lowermost tooth 49, for the purposes of the particular rack and pawl construction illustrated, is mounted at the extreme lower end of the yoke 33, as shown.

The pawl 46 is generally L-shaped in side elevation and includes the engagement dog 52 and the release arm 53, both of which connect preferably integrally into a generally cylindrical hub portion 54. Further, a tension spring 55 preferably surrounds the hub portion 54 and is connected at one end to the release arm 53 and at the other end to a resilient holding member generally indicated at 56, with this spring being at zero tension to normally retain the pawl 46 in the position shown in Fig. 1, but being in tension and urging the pawl in a clockwise direction when the pawl has been rotated counterclockwise, as shown in Figs. 3 through 7.

As best seen in Figs. 8, 10 and 11, the pawl hub portion 54 is provided with a slightly raised radially projecting portion 57 circumferentially adjacent a recess or indented portion 58 at a particular location on the circumference of the hub portion 54 and spaced axially adjacent the spring 55. Further, the resilient holding member 56 is formed with a spring-pressed plunger 59 which resiliently bears against the hub portion 54 in circumferential alignment with the radially projecting portion 57 and recess 58.

Holding member 56, as best seen in Fig. 10, is formed with a mounting block 60 which is secured to the main frame member 25 by any usual means, such as the pins 61, and this block threadably receives a plunger casing 62. Casing 62 is axially aligned with the radially projecting portion 57 and recess 58 of the pawl hub portion 54 and telescopically receives the plunger 59, compression spring 63, and plug 64.

As shown in Fig. 10, plug 64 is threadably received in the plunger casing 62 at the end of this casing away from the pawl 46, with the spring 63 being positioned between the plug and plunger 59, so that the plunger 59 projects from the plunger casing 62 and bears against the pawl hub portion 54 in circumferential alignment with the radially projecting portion 57 and recess 58. Thus, the plunger 59 is resiliently urged against the pawl hub portion 54 by spring 63, and when the pawl 46 is rotated to proper position, this plunger will snap into the recess 58 into the position shown for instance in full lines in Figs. 4 and 12.

The purpose of the particular configuration of the rack 45, pawl 46 and resilient holding member 56 can best be understood by progressively following the various steps of operation of the sealing tool construction comprising the present invention, so that a description of the operation thereof follows.

Prior to the operation of the sealing tool of the present invention and at the beginning of the closing stroke of the sealing jaws 21, the various parts of the construction are in the position shown in Fig. 1. In this position, the shoulders 37 on yoke 33 are abutting the adjusting plate 34, so that the operating shaft 24 and yoke 33 are in their maximum upward positions retaining the sealing jaws 21 in their maximum open position through the operating links 40.

Further, the tension spring 55 surrounding the pawl hub portion 54 is in its zero tension position retaining the pawl release arm extending substantially vertically upwardly and the pawl engagement dog 52 extending in the direction of the rack 45 but spaced below and underlying the lowermost tooth 49 of rack 45. Also, the plunger 59 is resiliently engaged with the pawl hub portion 54 but spaced circumferentially from the radially projecting portion 57 and recess 58 of the pawl, so that in this position the pawl may be freely rotated around the integral mounting pin 47 in a counterclockwise direction, as shown in Fig. 1, but against the tension of the spring 55.

To begin operation, the operator positions the sealing jaws 21 adjacent the sides of a generally U-shaped metal seal which is to be sealed or crimped by grasping the gripping handles 29, and after the sealing jaws are properly positioned, operation is begun by actuating the supply valve 31 which actuates the fluid motor 23. Actuation of the fluid motor 23 starts the operating shaft 24 and yoke 33 reciprocally downwardly beginning to close the sealing jaws 21, and as this downward movement continues the lowermost tooth 49 of rack 45 engages the pawl engagement dog 52 rotating the pawl 46 in a counterclockwise direction, as shown in Fig. 3, so that the engagement dog 52 slips over the end of tooth 49, as shown in broken lines in Fig. 3, and assumes the full line position of Fig. 3 above tooth 49 and below the middle tooth 50.

In this position, the pawl engagement dog 52 is engaged above the lowermost tooth 49 and the distance that this dog extends from the center of rotation of the pawl 46 is greater than the lateral distance between this pawl center of rotation and the portions of rack 45 between the teeth 49, 50 and 51 thereof, so that at this point if the movement of the operating shaft 24 and yoke 33 were reversed moving the rack 45 upwardly, the engagement dog 52 would engage the lowermost tooth 49 and prevent further upward movement of the rack 45, yoke 33 and operating shaft 24. Further upward movement would be prevented because such movement may only be accompanied by counterclockwise movement of dog 52, which causes dog 52 to jamb laterally against rack 45. Thus, once the pawl engagement dog 52 has slipped over the lowermost tooth 49 of rack 45 to the position shown in Fig. 3, the sealing operation cannot be reversed but must be carried through to completion until the seal is properly sealed or crimped around the overlapped ends of strapping.

As the fluid motor 23 continues to move the operating shaft 24 and yoke 33 downwardly, the yoke continues to close the sealing jaws 21, and during this downward movement, the pawl engagement dog 52 slips over the middle tooth 50 of rack 45 and ultimately rides up onto the uppermost tooth 51. Due to the relative sizes of the lowermost tooth 49 and middle tooth 50 of rack 45, it is possible for the pawl engagement dog 52 to rotate a sufficient distance counterclockwise, as viewed in Figs. 1 and 3, to slip over these teeth as the rack 45 is moved downwardly by the yoke 33, without the resilient holding member plunger 59 reaching the radially projecting portion 57 and recess 58 of the pawl hub portion 54, so that the plunger 59 during this period merely bears against the slides over the pawl hub portion 54.

When, however, the rack 45 has moved downwardly a sufficient distance for the pawl engagement dog 52 to reach the extreme end of the uppermost tooth 51 of rack 45, as shown in Fig. 4, in view of the greater size of this uppermost tooth 51, the pawl 46 has been rotated a sufficient distance counterclockwise so that the plunger 59 has ridden up over the radially projecting portion 57 of the pawl hub portion 54 and has begun to engage into the recess 58. At the beginning of this engagement between the plunger 59 and the recess 58, the pawl 46 is in the position shown in broken lines in Fig. 4, and due to the spring 63 of the resilient holding member 56 urging the plunger 59 toward the pawl hub portion 54, once the plunger begins to engage in recess 58, it snaps completely into this recess to the position shown in full lines in Figs. 4 and 12, so that the pawl 46 is rotated counterclockwise to its full line position shown in Figs. 4 and 12 and retained therein by the plunger 59 engaged in the recess 58.

Further, at the time this retaining or locking action of the pawl 46 takes place, the operating shaft 24 and yoke 33 have reached the lower end of their downward stroke and the sealing jaws 21 are in their completely closed or sealing position, as shown in Fig. 4. At this time, the generally U-shaped seal being crimped has been fully and completely deformed to tightly engage around the overlapped ends of the strapping being sealed.

The supply valve 31 of the fluid motor 23 is then released by the operator and the operating shaft 24 and yoke 33 start their upward movement beginning to open the sealing jaws 21. Furthermore, at this point, the plunger 59 of the resilient holding member 56 is securely engaged in the recess 58 of the pawl hub portion 54, retaining the pawl 46 in its full line position shown in Fig. 4 completely disengaged from the rack 45 and permitting the rack teeth 49, 50 and 51 to move upwardly without interference, as shown in Fig. 5.

Still further, since the pawl 46 has been rotated in a counterclockwise direction to its position resiliently locked by the plunger 59, as shown in Fig. 5, the pawl release arm 53 has likewise been rotated counterclockwise to a position in which a portion of this release arm overlies at least the uppermost tooth 51 of rack 45 but is spaced a distance about this tooth. Thus, the operating shaft 24 and yoke 33 are free to move upwardly progressively opening the sealing jaws 21, and the pawl 46 will not be contacted by the rack 45 until intermediate or more than halfway through the opening stroke of the sealing jaws 21, and until the uppermost tooth 51 of rack 45 comes into contact with the pawl release arm 53, as shown in Fig. 6.

At this point, continued upward movement of the operating shaft 24 and yoke 33 causes the uppermost tooth 51 of rack 45 to move the pawl 46 through contact with the pawl release arm 53 in a clockwise direction, from the locked position of the pawl, as shown in Fig. 6, through the broken line position shown in Fig. 7, and ultimately to the full line position shown in Fig. 7. Due to the resilient mounting of the holding member plunger 59, the upward force of rack 45 overcomes the resilient force of the holding member spring 63 causing the plunger to move out of the pawl recess 58 and ride up on and slightly to the side of the pawl radially projecting portion 57 to the position shown in broken lines in Fig. 7.

This pawl radially projecting portion 57 then helps to cause the pawl 46 to snap to its full line position shown in Fig. 7 in view of the holding member plunger 59 being resiliently urged toward the pawl hub portion 54 by the spring 63 and the tendency of this resilient urging to cause the plunger 59 to ride down the pawl radially projecting portion 57 and to seek the normal diameter of the pawl hub portion 54. Further, when the plunger 59 releases the pawl 46, the spring 55 around the pawl hub portion 54 also resiliently urges the pawl to rotate in the clockwise direction so that as shown in the full line position of Fig. 7, the engagement dog 52 of pawl 46 then engages the undersurface of the lowermost tooth 49 of rack 45, and pawl 46 continues to be urged clockwise toward its normal at rest position, as shown in Fig. 1.

Thus, the operating shaft 24 and yoke 33 are free to continue their upward movement continuing to open the sealing jaws 21, and during the remainder of this opening stroke the engagement dog 52 of pawl 46, although in contact with the rack 45, does not again engage the rack teeth but merely slides along the lower surface of the lowermost tooth 49 until ultimately the pawl 46 has returned to its normal position shown in Fig. 1. Thereafter, the operating shaft 24 and yoke 33 continue upwardly to their starting positions completely opening the sealing jaws 21 and finally come to rest at their starting positions, as shown in Fig. 1.

As is clearly shown in Fig. 7, during the opening stroke of the sealing jaws 21, the release arm 53 of the pawl 46 is completely out of engagement with the rack 45 for the entire opening stroke and is even out of contact with the rack 45 for more than one-half of this opening stroke. Furthermore, because of the particular configuration of the sealing jaws 21 acting against the bridge member 43 to deform or crimp the seal, at this point of release of the pawl 46, as shown in Fig. 7, the sealing jaws 21 will be in a position to almost completely release the seal so that even though the seal should become wedged between the sealing jaws 21 and against the bridge member 43 during the sealing operation, it can be easily released during the first portion of the sealing jaw opening stroke.

Still further, merely by slightly changing the configuration of the pawl release arm 53 or the positioning of this pawl release arm on the pawl hub portion 54, it is easily possible to change the exact point during the closing stroke when the pawl 46 is released from the engagement with the resilient holding member 56. For this reason, such changes can be easily made for causing the release of the pawl 46 at a later period during the closing stroke if desired, and such obvious changes are contemplated within the scope of the present invention.

Thus, according to the foregoing description, a sealing tool construction has been provided in which rack and pawl means automatically engage during the closing stroke of the sealing jaws to prevent reversal of such stroke until completed and to insure that the sealing stroke will be completed and the seal properly deformed or crimped. Also, this construction provides such a rack and pawl in which the pawl is automatically disengaged from the rack at the completion of the closing stroke of the sealing jaws and is resiliently retained in such disengaged position during the major portion of the opening stroke of the sealing jaws so that these sealing jaws may be freely moved during their opening stroke for conveniently removing any seals which may be wedged therein.

In the foregoing description, certain terms have been used for brevity, clearness and understanding, but no unnecessary limitations are to be implied therefrom, because such words are used for descriptive purposes herein and are intended to be broadly construed.

Moreover, the embodiment of the improved construction illustrated and described herein is by way of example, and the scope of the present invention is not limited to the exact details of construction shown.

Having now described the invention, the construction, operation and use of a preferred embodiment thereof, and the advantageous new and useful results obtained thereby; the new and useful construction and reasonable mechanical equivalents thereof obvious to those skilled in the art are set forth in the appended claims.

I claim:

1. Sealing tool construction including a main frame member, sealing jaws operably connected to the main frame member and selectively movable through a closing stroke to a closed position and through an opening stroke to an open position, operating means operably connected to the main frame member and sealing jaws selectively actionable for moving the sealing jaws through the closing and opening strokes, rack means having at least two spaced teeth projecting therefrom operably connected to one of the operating means and main frame member, pawl means operably connected to the other of the operating means and main frame member and being engageable with the rack means teeth, the rack and pawl means resisting reverse movement of the sealing jaws when the pawl means is engaged with the rack means teeth during the sealing jaw closing stroke, reversing means including a projection member on the rack means automatically engageable with the pawl means through said projection member for placing the pawl means in position to engage the rack means teeth during the sealing jaw closing stroke, and said rack means reversing means being automatically engageable with the pawl means through the same projection member for placing the pawl means in a position completely disengaged from the rack means teeth during the sealing jaw opening stroke.

2. Sealing tool construction including a main frame member, sealing jaws operably connected to the main frame member and selectively movable through a closing stroke to a closed position and through an opening stroke to an open position, operating means operably connected to the main frame member and sealing jaws selectively actionable for moving the sealing jaws through the closing and opening strokes, rack means having at least two spaced teeth projecting therefrom operably connected to one of the operating means and main frame member, pawl means operably connected to the other of the operating means and main frame member and being engageable with the rack means teeth, the rack and pawl means resisting reverse movement of the sealing jaws when the pawl means is engaged with the rack means teeth during the sealing jaw closing stroke, reversing means including a projection member on the rack means automatically engageable with the pawl means through said projection member for placing the pawl means in position to engage the rack means teeth during the sealing jaw closing stroke, said rack means reversing means being automatically engageable with the pawl means through the same projection member for placing the pawl means in a position completely disengaged from the rack means teeth during the sealing jaw opening stroke, and resilient retaining means automatically resiliently engageable with the pawl means when the pawl means is in said position completely disengaged from the rack means teeth during the sealing jaw opening stroke for resiliently maintaining the pawl means in said completely disengaged position.

3. Sealing tool construction including a main frame member, sealing jaws operably connected to the main frame member and selectively movable through a closing stroke to a closed position and through an opening stroke to an open position, operating means operably connected to the main frame member and sealing jaws selectively actionable for moving the sealing jaws through the closing and opening strokes, rack means having at least two spaced teeth projecting therefrom operably connected to one of the operating means and main frame member, pawl means pivotally connected to the other of the operating means and main frame member and having an engagement dog and a release arm angularly spaced from said engagement dog, the pawl means engagement dog being engageable with the rack means teeth, the rack and pawl means resisting reverse movement of the sealing jaws when the pawl means engagement dog is engaged with the rack means teeth during the sealing jaw closing stroke, reversing means on the rack means automatically engageable with the pawl means release arm for placing the pawl means engagement dog in position to engage the rack means teeth during the sealing jaw closing stroke, and said rack means reversing means being automatically engageable with the pawl means engagement dog for placing the pawl means engagement dog in a position completely disengaged from the rack means teeth during the sealing jaw opening stroke.

4. Sealing tool construction including a main frame member, sealing jaws operably connected to the main frame member and selectively movable through a closing stroke to a closed position and through an opening stroke to an open position, operating means operably connected to the main frame member and sealing jaws selectively actionable for moving the sealing jaws through the closing and opening strokes, rack means having at least two spaced teeth projecting therefrom operably connected to one of the operating means and main frame member, pawl means pivotally connected to the other of the operating means and main frame member and having an engagement dog and a release arm angularly spaced from said engagement dog, the pawl means engagement dog being engageable with the rack means teeth, the rack and pawl means resisting reverse movement of the sealing jaws when the pawl means engagement dog is engaged with the rack means teeth during the sealing jaw closing stroke, reversing means on the rack means automatically engageable with the pawl means release arm for placing the pawl means in position to engage the rack means teeth during the sealing jaw closing stroke, said rack means reversing means being automatically engageable with the pawl means engagement dog for placing the pawl means engagement dog in a position completely disengaged from the rack means teeth during the sealing jaw opening stroke, and resilient retaining means automatically resiliently engageable with the pawl means when the pawl means engagement dog is in said position completely disengaged from the rack means teeth during the sealing jaw opening stroke for resiliently maintaining the pawl means engagement dog in said completely disengaged position.

5. Sealing tool construction including a main frame member, sealing jaws operably connected to the main frame member and selectively movable through a closing stroke to a closed position and through an opening stroke to an open position, operating means operably connected to the main frame member and sealing jaws selectively actionable for moving the sealing jaws through the closing and opening strokes, said operable connection between the operating means and sealing jaws including a yoke member reciprocally mounted on the main frame member and moving vertically downwardly during the sealing jaw closing stroke and vertically upwardly during the sealing jaw opening stroke, rack means mounted on the yoke member and having at least two vertically spaced engagement teeth projecting therefrom and a reversing tooth larger than said engagement teeth and spaced vertically above said engagement teeth, pawl means pivotally connected to the main frame member and having an engagement dog and a release arm, the pawl means engagement dog being engageable with the rack means engagement teeth, the rack and pawl means resisting reverse movement of the sealing jaws when the pawl means engagement dog is engaged with the rack means engagement teeth during the sealing jaw closing stroke, the rack means reversing tooth engaging the pawl means release arm during the latter portion of the sealing jaw opening stroke and placing the pawl means engagement dog in position to engage the rack means engagement teeth during the sealing jaw closing stroke, and said rack means reversing tooth engaging the pawl means engagement dog at the completion of the sealing jaw closing stroke placing the pawl means engagement dog in a position completely disengaged from the rack means engagement teeth during the sealing jaw opening stroke.

6. Sealing tool construction including a main frame member, sealing jaws operably connected to the main frame member and selectively movable through a closing stroke to a closed position and through an opening stroke to an open position, operating means operably connected to the main frame member and sealing jaws selectively actionable for moving the sealing jaws through the closing and opening strokes, said operable connection between the operating means and sealing jaws including a yoke member reciprocally mounted on the main frame member and moving vertically downwardly during the sealing jaw closing stroke and vertically upwardly during the sealing jaw opening stroke, rack means mounted on the yoke member and having at least two vertically spaced engagement teeth projecting therefrom and a reversing tooth larger than said engagement teeth and spaced vertically above said engagement teeth, pawl means pivotally connected to the main frame member and having an engagement dog and a release arm, the pawl means engagement dog being engageable with the rack means engagement teeth, the rack and pawl means resisting reverse movement of the sealing jaws when the pawl means engagement dog is engaged with the rack means engagement teeth during the sealing jaw closing stroke, the rack means reversing tooth engaging the pawl means release arm during the latter portion of the sealing jaw opening stroke and placing the pawl means engagement dog in position to engage the rack means engagement teeth during the sealing jaw closing stroke, said rack means reversing tooth engaging the pawl means engagement dog at the completion of the sealing jaw closing stroke placing the pawl means engagement dog in a position completely disengaged from the rack means engagement teeth during the sealing jaw opening stroke, and a spring-pressed plunger operably connected to the main frame member automatically resiliently engageable with the pawl means when the pawl means is in said position with the pawl means engagement dog completely disengaged from the rack means engagement teeth during the sealing jaw opening stroke for resiliently maintaining the pawl means engagement dog in said completely disengaged position.

7. Sealing tool construction including a main frame member, sealing jaws pivotally connected to the main frame member selectively pivotal through a closing stroke to a closed position and through an opening stroke to an open position, selectively operable power means operably connected to the main frame member having a vertically reciprocal operating shaft, a vertically reciprocal yoke connected to the operating shaft, operating links pivotally connected to the yoke and pivotally connected to the sealing jaws moving the sealing jaws through the closing stroke to the closed position when the operating shaft and yoke are moved vertically downwardly and moving the sealing jaws through the opening stroke to the open position when the operating shaft and yoke are moved vertically upwardly, rack means having at least two spaced teeth projecting therefrom connected to the yoke, pawl means pivotally connected to the main frame member and being engageable with the rack means teeth, the rack and pawl means resisting reverse movement of the sealing jaws when the pawl means is engaged with the rack means teeth during the sealing jaw closing stroke, reversing means including a projection member on the rack means automatically engageable with the pawl means through said projection member during the latter portion of the sealing jaw opening stroke for placing the pawl means in position to engage the rack means teeth during the sealing jaw closing stroke, and said rack means reversing means being automatically engageable with the pawl means through the same projection member at the completion of the sealing jaw closing stroke for placing the pawl means in a position completely disengaged from the rack means teeth during the sealing jaw opening stroke.

8. Sealing tool construction including a main frame member, sealing jaws pivotally connected to the main frame member selectively pivotal through a closing stroke to a closed position and through an opening stroke to an open position, selectively operable power means operably connected to the main frame member having a vertically reciprocal operating shaft, a vertically reciprocal yoke connected to the operating shaft, operating links pivotally connected to the yoke and pivotally connected to the sealing jaws moving the sealing jaws through the closing stroke to the closed position when the operating shaft and yoke are moved vertically downwardly and moving the sealing jaws through the opening stroke to the open position when the operating shaft and yoke are moved vertically upwardly, rack means having at least two spaced teeth projecting therefrom connected to the yoke, pawl means pivotally connected to the main frame member and having an engagement dog and a release arm angularly spaced from said engagement dog, the pawl means engagement dog being engageable with the rack means teeth, the rack and pawl means resisting reverse movement of the sealing jaws when the pawl means engagement dog is engaged with the rack means teeth during the sealing jaw closing stroke, reversing means including a projection member on the rack means automatically engageable with the pawl means release arm through said projection member during the latter portion of the sealing jaw opening stroke for placing the pawl means engagement dog in position to engage the rack means teeth during the sealing jaw closing stroke, said rack means reversing means being automatically engageable with the pawl means engagement dog through the same projection means at the completion of the sealing jaw closing stroke for placing the pawl means engagement dog in a position completely disengaged from the rack means teeth during the sealing jaw opening stroke, and resilient retaining means automatically resiliently engageable with the pawl means when the pawl means engagement dog is in said position completely disengaged from the rack means teeth during the sealing jaw opening stroke for resiliently maintaining the pawl means engagement dog in said completely disengaged position.

9. Sealing tool construction including a main frame member, sealing jaws pivotally connected to the main frame member selectively pivotal through a closing stroke to a closed position and through an opening stroke to an open position, selectively operable power means operably connected to the main frame member having a vertically reciprocal operating shaft, a vertically reciprocal yoke connected to the operating shaft, operating links pivotally connected to the yoke and pivotally connected to the sealing jaws moving the sealing jaws through the closing stroke to the closed position when the operating shaft and yoke are moved vertically downwardly and moving the sealing jaws through the opening stroke to the open position when the operating shaft and yoke are moved vertically upwardly, rack means mounted on the yoke and having at least two vertically spaced engagement teeth projecting therefrom and a reversing tooth larger than said engagement teeth and spaced vertically above said engagement teeth, pawl means pivotally connected to the main frame member and having an engagement dog and a release arm, the pawl means engagement dog being engageable with rack means engagement teeth, the rack and pawl means resisting reverse movement of the sealing jaws when the pawl means engagement dog is engaged with the rack means engagement teeth during the sealing jaw closing stroke, the rack means reversing tooth engaging the pawl means release arm during the latter portion of the sealing jaw opening stroke and placing the pawl means engagement dog in position to engage the rack means engagement teeth during the sealing jaw closing stroke, and said rack means reversing tooth engaging the pawl means engagement dog at the completion of the sealing jaw closing stroke placing the pawl means engagement dog in a position completely disengaged from the rack means engagement teeth during the sealing jaw opening stroke.

10. Sealing tool construction including a main frame member, sealing jaws pivotally connected to the main frame member selectively pivotal through a closing stroke to a closed position and through an opening stroke to an open position, selectively operable power means operably connected to the main frame member having a vertically reciprocal operating shaft, a vertically reciprocal yoke connected to the operating shaft, operating links pivotally connected to the yoke and pivotally connected to the sealing jaws moving the sealing jaws through the closing stroke to the closed position when the operating shaft and yoke are moved vertically downwardly and moving the sealing jaws through the opening stroke to the open position when the operating shaft and yoke are moved vertically upwardly, rack means having at least two spaced teeth projecting therefrom connected to the yoke, pawl means pivotally connected to the main frame member and having an engagement dog and a release arm angularly spaced from said engagement dog, the pawl means engagement dog being engageable with the rack means teeth, the rack and pawl means resisting reverse movement of the sealing jaws when the pawl means engagement dog is engaged with the rack means teeth during the sealing jaw closing stroke, reversing means on the rack means automatically engageable with the pawl means release arm during the latter portion of the sealing jaw opening stroke for placing the pawl means engagement dog in position to engage the rack means teeth during the sealing jaw closing stroke, and said rack means reversing means being automatically engageable with the pawl means engagement dog at the completion of the sealing jaw closing stroke for placing the pawl means engagement dog in a position completely disengaged from the rack means teeth during the sealing jaw opening stroke.

11. Sealing tool construction including a main frame member, sealing jaws operably connected to the main frame member and selectively movable through a closing stroke to a closed position and through an opening stroke to an open position, operating means operably connected to the main frame member and sealing jaws selectively actionable for moving the sealing jaws through the closing and opening strokes, rack means having at least two spaced teeth projecting therefrom operably connected to one of the operating means and main frame member, pawl means pivotally connected to the other of the operating means and main frame member and having an engagement dog and a release arm angularly spaced from said engagement dog, the pawl means engagement dog being engageable with the rack means teeth, the rack and pawl means resisting reverse movement of the sealing jaws when the pawl means engagement dog is engaged with the rack means teeth during the sealing jaw closing stroke, reversing means including a projection member on the rack means automatically engageable with the pawl means release arm through said projection member for placing the pawl means engagement dog in position to engage the rack means teeth during the sealing jaw closing stroke, and said rack means reversing means being automatically engageable with the pawl means engagement dog through the same projection member for placing the pawl means engagement dog in a position completely disengaged from the rack means teeth during the sealing jaw opening stroke.

12. Sealing tool construction including a main frame member, sealing jaws operably connected to the main frame member and selectively movable through a closing stroke to a closed position and through an opening stroke to an open position, operating means operably connected to the main frame member and sealing jaws selectively actionable for moving the sealing jaws through the closing and opening strokes, rack means having at least two spaced teeth projecting therefrom operably connected to one of the operating means and main frame member, pawl means pivotally connected to the other of the operating means and main frame member and having an engagement dog and a release arm angularly spaced from said engagement dog, the pawl means engagement dog being engageable with the rack means teeth, the rack and pawl means resisting reverse movement of the sealing jaws when the pawl means engagement dog is engaged with the rack means teeth during the sealing jaw closing stroke, reversing means including a projection member on the rack means automatically engageable with the pawl means release arm through said projection member for placing the pawl means engagement dog in position to engage the rack means teeth during the sealing jaw closing stroke, said rack means reversing means being automatically engageable with the pawl means engagement dog through the same projection member for placing the pawl means engagement dog in a position completely disengaged from the rack means teeth during the sealing jaw opening stroke, and resilient retaining means automatically resiliently engageable with the pawl means when the pawl means engagement dog is in said position completely disengaged from the rack means teeth during the sealing jaw opening stroke for resiliently maintaining the pawl means engagement dog in said completely disengaged position.

References Cited in the file of this patent

UNITED STATES PATENTS

| | | |
|---|---|---|
| 953,507 | Beale | Mar. 29, 1910 |
| 2,831,381 | Lingle | Apr. 22, 1958 |
| 2,855,813 | Hepler | Oct. 14, 1958 |